US007363471B2

(12) United States Patent
Berkowits et al.

(10) Patent No.: US 7,363,471 B2
(45) Date of Patent: Apr. 22, 2008

(54) APPARATUS, SYSTEM, AND METHOD OF DYNAMIC BINARY TRANSLATION SUPPORTING A DENORMAL INPUT HANDLING MECHANISM

(75) Inventors: Sion Berkowits, Haifa (IL); Orna Etzion, Haifa (IL); Li Jianhui, Shanghai (CN)

(73) Assignee: Intel Corporation, Santa Clara ( * ) Notice: Subject to any disclaimer, the term of this patent is extended or adjusted under 35 U.S.C. 154(b) by 102 days.

(21) Appl. No.: 11/166,628

(22) Filed: Jun. 27, 2005

(65) Prior Publication Data

US 2006/0294508 A1    Dec. 28, 2006

(51) Int. Cl.
G06F 7/38      (2006.01)
G06F 9/455     (2006.01)

(52) U.S. Cl. .................................. 712/221; 712/244
(58) Field of Classification Search ............ 712/221, 712/244, 209
See application file for complete search history.

(56) References Cited

U.S. PATENT DOCUMENTS 6,000,028 A * 12/1999 Chernoff et al. ............ 712/226
6,105,047 A *  8/2000 Sharangpani et al. ....... 708/495
6,247,117 B1 * 6/2001 Juffa ........................... 712/222
6,681,322 B1 * 1/2004 Safford et al. .............. 712/244
2003/0126419 A1 * 7/2003 Gao et al. .................... 712/244
2004/0015627 A1 * 1/2004 Desoli et al. ................ 710/260

FOREIGN PATENT DOCUMENTS

WO    WO 01/27873    4/2001

OTHER PUBLICATIONS

International Search Report. International Application No. PCT/US2006/025321. Mailing date Oct. 25, 2006.

* cited by examiner

*Primary Examiner*—Eddie Chan
*Assistant Examiner*—William B Partridge
(74) *Attorney, Agent, or Firm*—Pearl Cohen Zedek Latzer, LLP (57) ABSTRACT

A method may translate a set of source instructions into a set of target instructions, execute the set of target instructions, and unmask a denormal input control bit if the set of source instructions uses a denormal input handling mechanism. A method may detect at least one denormal exception of a faulty target instruction by executing the set of target instructions; assign a predetermined value to one or more denormal operands of the faulty target instruction; and execute the faulty target instruction with the predetermined value for the one or more denormal operands. An apparatus, system, and machine-readable medium may perform such methods.

25 Claims, 7 Drawing Sheets

APPARATUS, SYSTEM, AND METHOD OF DYNAMIC BINARY TRANSLATION SUPPORTING A DENORMAL INPUT HANDLING MECHANISM

BACKGROUND OF THE INVENTION

Some computer platforms conforming to, for example, Intel® Architecture-32 (IA-32) may support a feature known as Denormals-Are-Zeroes (DAZ) for handling denormal inputs or operands during execution of a program code. The platforms may include a control bit, referred to herein as a DAZ bit, which controls responses to Single Instruction Multiple Data (SIMD) instructions that are under a floating-point (FP) denormal exception condition. The program code may have one or more control instructions that control the DAZ bit in the platform. The control instructions may set the DAZ bit to one of two values, for example, "1" and "0". When the DAZ bit is set to "1", for example, a processor running on the platform supporting the DAZ feature may detect an instruction that raises a denormal exception condition during the code execution, and may assign denormal operands of the instruction, which is an excepted instruction, with a predetermined value, for example, zero with signs of the original operands. The processor may then execute the excepted instruction with the new value of operands. The handling of denormal operands described above may be referred to herein as a denormal input handling mechanism, or a DAZ mechanism.

A dynamic binary translator may translate a source code, for example, an IA-32 code conforming to a source architecture supporting the DAZ feature into a target code to be executed on a target platform. The target platform may have a floating-point model and therefore may be able to raise Streaming SIMD Extension (SSE) exceptions such as denormal exceptions. However, the target platform may not support the DAZ feature in handling denormal inputs of a denormal exception. One such target platform may be, for example, a platform conforming to the architecture of the Intel Itanium™ processor family.

BRIEF DESCRIPTION OF THE DRAWINGS

The subject matter regarded as the invention is particularly pointed out and distinctly claimed in the concluding portion of the specification. The invention, however, as to both organization and method of operation, together with objects, features, and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods and procedures have not been described in detail so as not to obscure the embodiments of the invention.

Some portions of the detailed description in the following are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the invention may include apparatuses for performing the operations herein. These apparatuses may be specially constructed for the desired purposes, or they may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROM), random access memories (RAM), electrically programmable read-only memories (EPROM), electrically erasable and programmable read only memories (EEPROM), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the invention are not described with reference to any particular programming language. It will be appreciated that a variety of programming languages may be used to implement the teachings of the invention as described herein.

In the following description, various figures, diagrams, flowcharts, models, and descriptions are presented as different means to effectively convey the substances and illustrate different embodiments of the invention that are proposed in this application. It shall be understood by those skilled in the art that they are provided merely as illustrative samples, and shall not be constructed as limitation to the invention.

Figure 1:
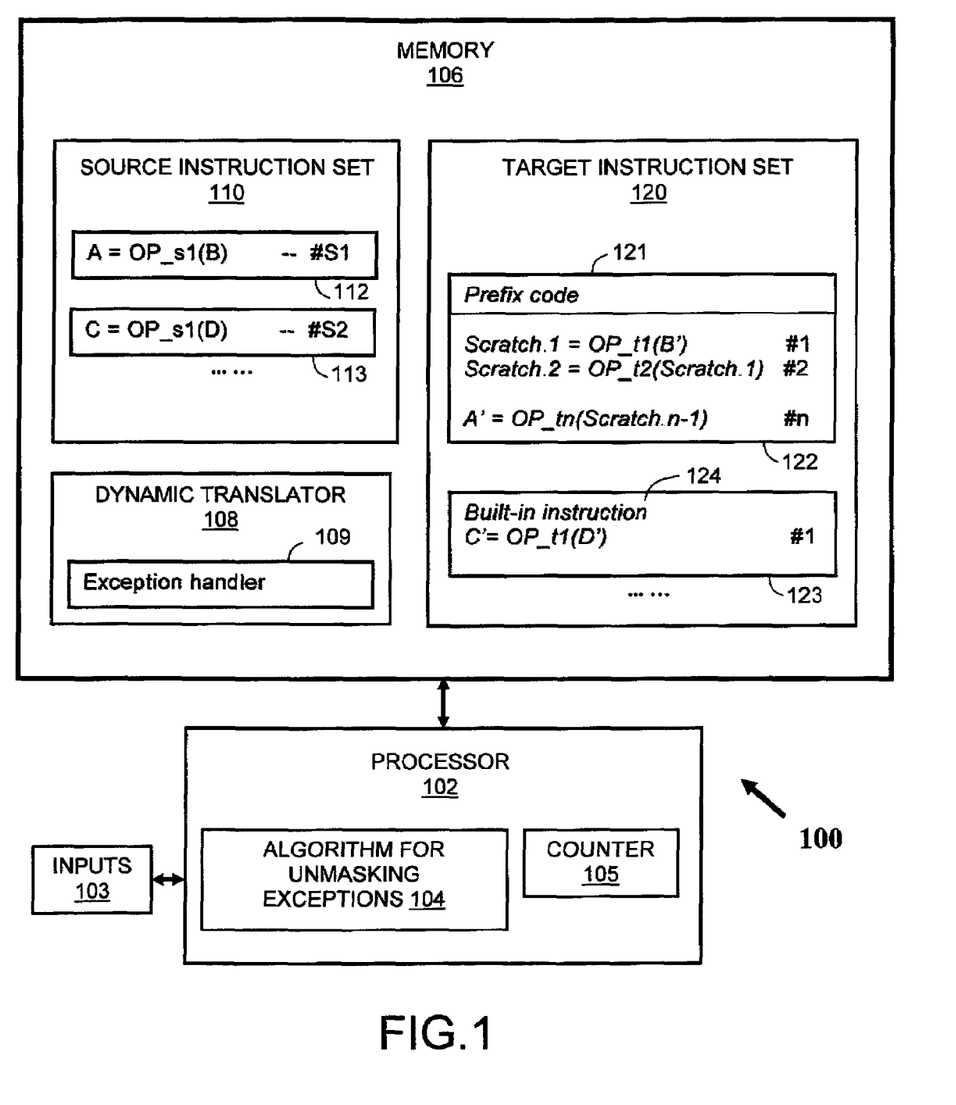
FIG. 1 is a block diagram illustration of an apparatus capable of performing dynamic binary translation with support for a DAZ mechanism, according to some illustrative embodiments of the invention.

FIG. 1 is a block diagram illustration of an apparatus 100 capable of performing dynamic binary translation with support for a DAZ mechanism, according to some illustrative embodiments of the invention. Apparatus 100 may be, for example, a computing platform, referred to herein as a target platform, and may include a processor 102 operatively connected to a memory 106.

According to embodiments of the invention, memory 106 may be adapted to store a set of source instructions 110, also referred to herein as "source code", and a set of target instructions 120, also referred to herein as "target code". Memory 106 may also store instructions of a dynamic binary translator 108. Processor 102 may execute dynamic binary translator 108 to translate source instruction set 110 into target instruction set 120. Processor 102 may then execute target instruction set 120 by applying inputs 103, and may apply an algorithm 104 to unmask a denormal input control bit on the target platform during target code execution, as described in detail below with reference to FIG. 2. Dynamic binary translator 108 may include an exception handler 109 to handle exceptions, such as denormal exception, as described in detail below with reference to FIGS. 3-7.

Source instruction set 110 may conform to a source architecture, e.g., IA-32, that is capable of supporting a denormal input handling mechanism, also refereed to herein as a DAZ mechanism. Source instruction set 110 may include one or more control instructions that may decide, when being executed on a source platform, whether the DAZ mechanism supported by the source platform shall be used by the source code. If the DAZ mechanism is used by the source code, the source architecture may respond to a SIMD floating-point denormal operand condition of an excepted instruction by converting denormal operands to zero with the signs of the original operands, and then execute the excepted instruction using the new value of the denormal operands.

Processor 102 may comply with a target architecture, e.g., the architecture of the Intel Itanium™ processor family. According to embodiments of the invention, processor 102 may not require hardware as requited in the source architecture in order to support the DAZ mechanism. Instead, according to illustrative embodiments of the invention, the DAZ mechanism may be emulated through dynamic binary translation during execution of target instruction set 120, as described in detail below.

A non-exhaustive list of examples for apparatus 100 may include a desktop personal computer, a work station, a server computer, a laptop computers, a notebook computer, a hand-held computer, a personal digital assistant (PDA), a mobile telephone, a game console, and the like.

A non-exhaustive list of examples for processor 102 may include a central processing unit (CPU), a digital signal processor (DSP), a reduced instruction set computer (RISC), a complex instruction set computer (CISC) and the like. Moreover, processor 102 may be part of an application specific integrated circuit (ASIC) or may be a part of an application specific standard product (ASSP).

Memory 106 may be fixed within or removable from apparatus 100. A non-exhaustive list of examples for memory 106 may include one or any combination of the following semiconductor devices, such as synchronous dynamic random access memory (SDRAM) devices, RAMBUS dynamic random access memory (RDRAM) devices, double data rate (DDR) memory devices, static random access memory (SRAM) devices, flash memory (FM) devices, electrically erasable programmable read only memory (EEPROM) devices, non-volatile random access memory (NVRAM) devices, universal serial bus (USB) removable memory, and the like; optical devices, such as compact disk read only memory (CD ROM), and the like; and magnetic devices, such as a hard disk, a floppy disk, a magnetic tape, and the like.

During execution of the source code, instructions in the source code may raise various exceptions. For example, source instructions conforming to the Intel® IA-32 architecture may support the following specific exceptions: "invalid operation", "division by zero", "overflow", "underflow" and "inexact calculation" floating point exceptions, as defined and required in the ANSI/IEEE standard 754-1985 for binary floating-point arithmetic. The above exceptions may generally be referred to as SSE exceptions. The target platform may include one or more control bits, including a denormal input control bit, that may be masked or unmasked to control the handling of the SSE exceptions. The control bits may be controlled by processor 102, through algorithm 104, as described in detail below with reference to FIG. 2. In addition, the source code may include one or more control instructions which control the setting of the DAZ bit in a source platform to determine whether the DAZ mechanism is used by the source code.

According to illustrative embodiments of the invention, the DAZ mechanism supported by a source platform and used by source code 110 may be emulated by dynamic binary translator 108 through execution of target code 120 on the target platform. Processor 102 may be adapted to run dynamic binary translator 108 to translate source instruction set 110 including, for example, source instructions 112 and/or 113, into target instruction set 120 including, for example, target instructions 122 and/or 123. During target code execution, processor 102 may execute algorithm 104 to unmask a denormal input control bit on the target platform so that one or more excepted source instructions, for example, source instruction 112, may be detected through the execution of one or more corresponding faulty target instructions, for example, target instruction 122.

According to illustrative embodiments of the invention, when a denormal exception is detected, the DAZ mechanism may be emulated by dynamic binary translator 108. The emulation may be made through dynamic binary translator 108 assigning denormal operands of a target instruction, which is a faulty target instruction corresponding to the denormal exception, with a predetermined value, for example, zero with signs of the original operands. Processor 102 may then execute the faulty target instruction with the newly assigned value for the denormal operands.

According to some illustrative embodiments of the invention, when a denormal exception is detected at a faulty target instruction 122, the corresponding excepted source instruction 112 may be re-translated to generate a new target instruction 122. In addition, a prefix code 121 may be generated and attached to the newly generated target instruction 122. Prefix code 121 may identify all the denormal operands to source instruction 112, and the controls performed by control instructions in source code 110 to determine whether the DAZ mechanism is used by the source code. If the DAZ mechanism is used by the source code, prefix code 121 may then emulate the DAZ mechanism as described in detail above.

According to illustrative embodiments of the invention, processor 102 may include a counter, for example, a cache-based counter 105, to count the number of denormal exceptions in a block of target instructions. If the number of denormal exceptions exceeds a predetermined threshold, dynamic binary translator 108 may emulate the DAZ mechanism as described in detail below with reference to FIG. 6.

Figure 2:
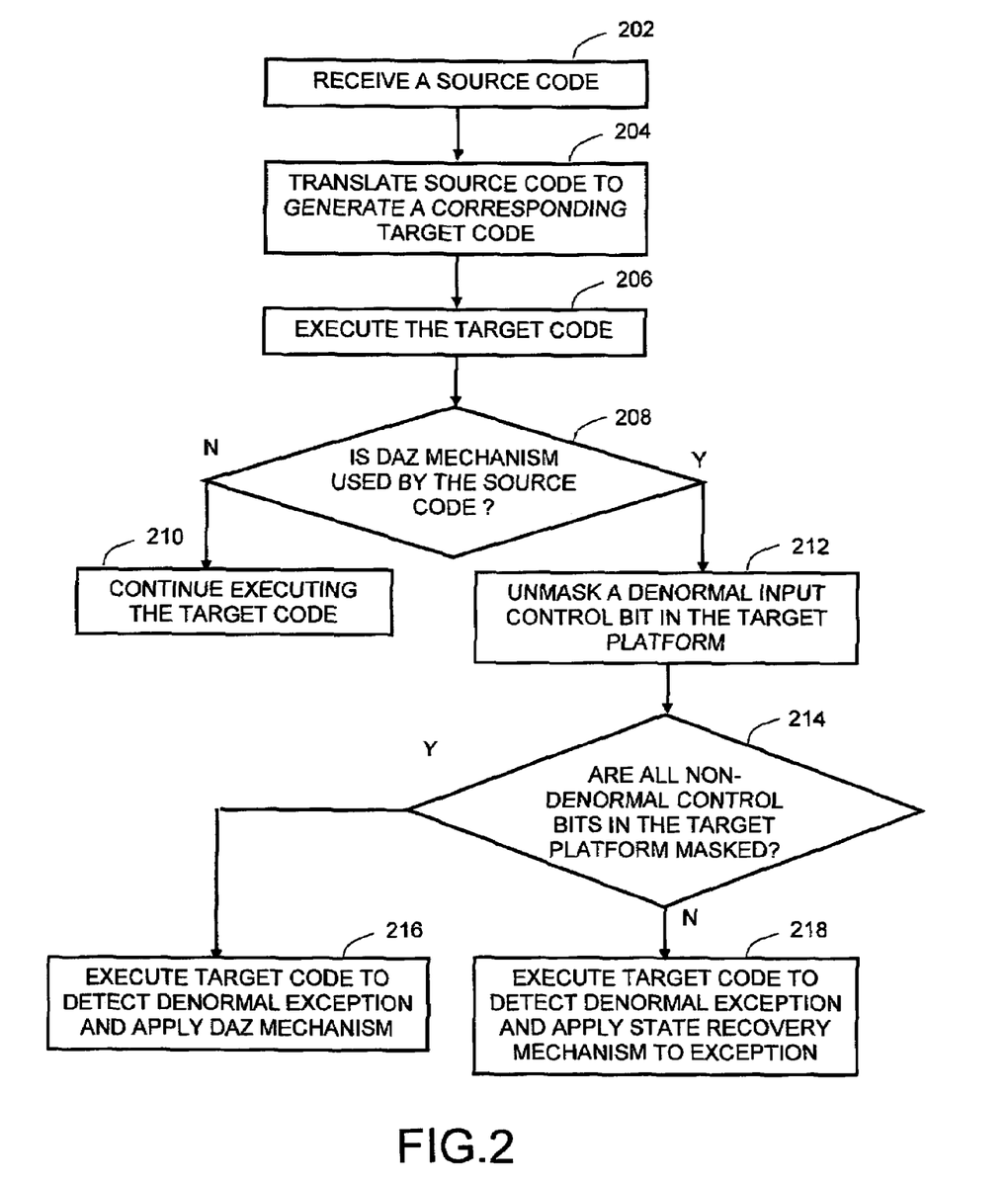
FIG. 2 is a schematic flowchart of a method of dynamic binary translation with support for a DAZ mechanism, according to illustrative embodiments of the invention.

FIG. 2 is a schematic flowchart of a method of dynamic binary translation with support for a DAZ mechanism according to illustrative embodiments of the invention.

According to illustrative embodiments of the invention, dynamic binary translator 108 may receive a source code, for example, source code 110, as indicated at block 202. Dynamic binary translator 108 may then translate source code 110 to generate a corresponding target code 120, as indicated at block 204, and execute target code 120 as indicated at block 206. Source code 110 may include one or more control instructions which may alter the setting of a DAZ bit in a source platform to decide whether the DAZ mechanism is used by the source code. During execution, if it is determined, as indicated at block 208, that controls performed by the control instructions in the source code indicate that the DAZ mechanism is used in the source code, processor 102 may unmask a denormal input control bit in the target platform, as indicated at block 212, so that denormal exceptions may be detected during the stage of code execution for DAZ handling. The unmasking of the denormal input control bit may be performed, for example, by processor 102 executing an unmasking algorithm, for example, algorithm 104 (FIG. 1)

According to illustrative embodiments of the invention, there may be two situations that require separate handling for denormal exceptions detected during target code execution. As is indicated at block 214, a first situation is when all SSE exceptions, not including denormal exceptions, are masked in the source code, and consequently the same non-denormal exceptions are masked in the corresponding target code. In this situation, processor 102 may execute the target code, detect a denormal exception, and apply the DAZ mechanism, as indicated at block 216 and described in detail below with reference to FIG. 3.

A second situation is when one or more of the non-denormal exceptions are unmasked in the source code, and consequently in the corresponding target code. In this situation, processor 102 may execute the target code, detect a denormal exception, and apply a state recovery mechanism to process the exception, as indicated at block 218 and described in detail below with reference to FIG. 4.

If it is determined, as indicated at block 208, that controls performed by the control instructions in the source code do not indicate that the DAZ mechanism is used by the source code, processor 102 may continue executing the target code as indicated at block 210.

Figure 3:
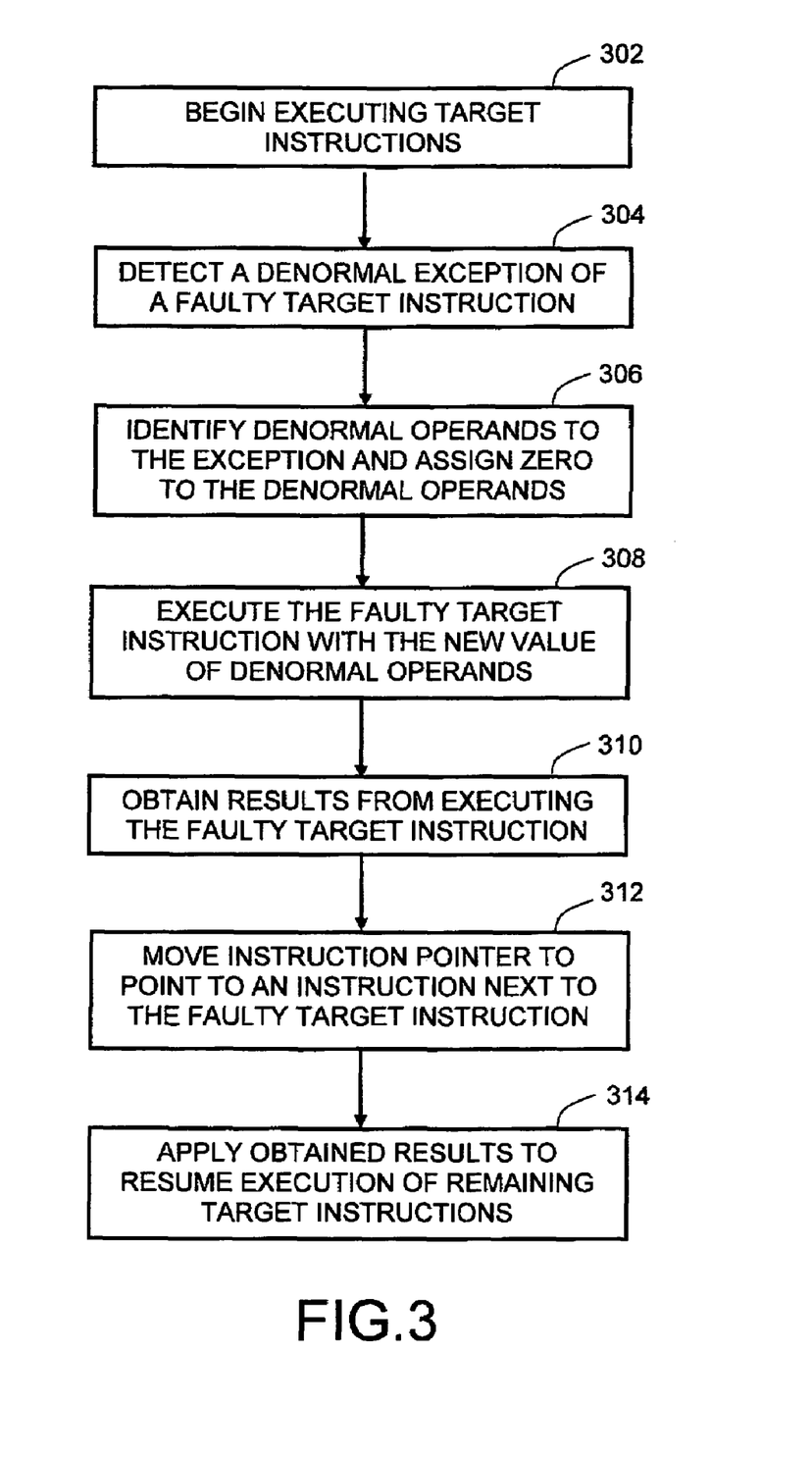
FIG. 3 is a schematic flowchart of a method of handling denormal exceptions during a program code execution when all non-denormal exceptions are masked, according to illustrative embodiments of the invention.

FIG. 3 is a schematic flowchart of a method of handling denormal exceptions during a program code execution when all non-denormal exceptions are masked according to illustrative embodiments of the invention. A denormal input control bit in the target platform is unmasked so that processor 102 may detect a denormal exception during target code execution.

According to illustrative embodiments of the invention, processor 102 may begin executing a set of target instructions, e.g., target instruction set 120, as indicated at block 302. The set of target instructions may correspond to a set of source instructions, e.g., source instruction set 110, that uses the DAZ mechanism. During execution, processor 102 may detect a faulty target instruction, e.g., target instruction 122, that raises a denormal exception, as indicated at block 304. The exception is a denormal exception because all non-denormal exceptions, i.e., SSE exceptions other than denormal exception, have been masked and therefore may not be detected. As indicated at block 306, upon detection of the denormal exception, processor 102 may identify denormal operands to the denormal exception, and may assign the denormal operands with a predetermined value, for example, zero, with the signs of the original operands. Processor 102 may then execute target instruction 122 with the new value of denormal operands as indicated at block 308. Results from the execution of target instruction 122 may be obtained, as indicated at block 310, and saved, for example, in an instruction cache associated with the processor, to be subsequently applied in the execution of following target instructions. At block 312, an instruction pointer used in the target code execution may be moved or incremented to point to a new target instruction, e.g., an instruction which follows the faulty target instruction 122. Execution of the remaining target instructions may be resumed at the new target instruction pointed by the instruction pointer, as indicated at block 314, and the results obtained from the execution of faulty target instruction 122, as indicated at block 310, may be applied in the execution.

Figure 4:
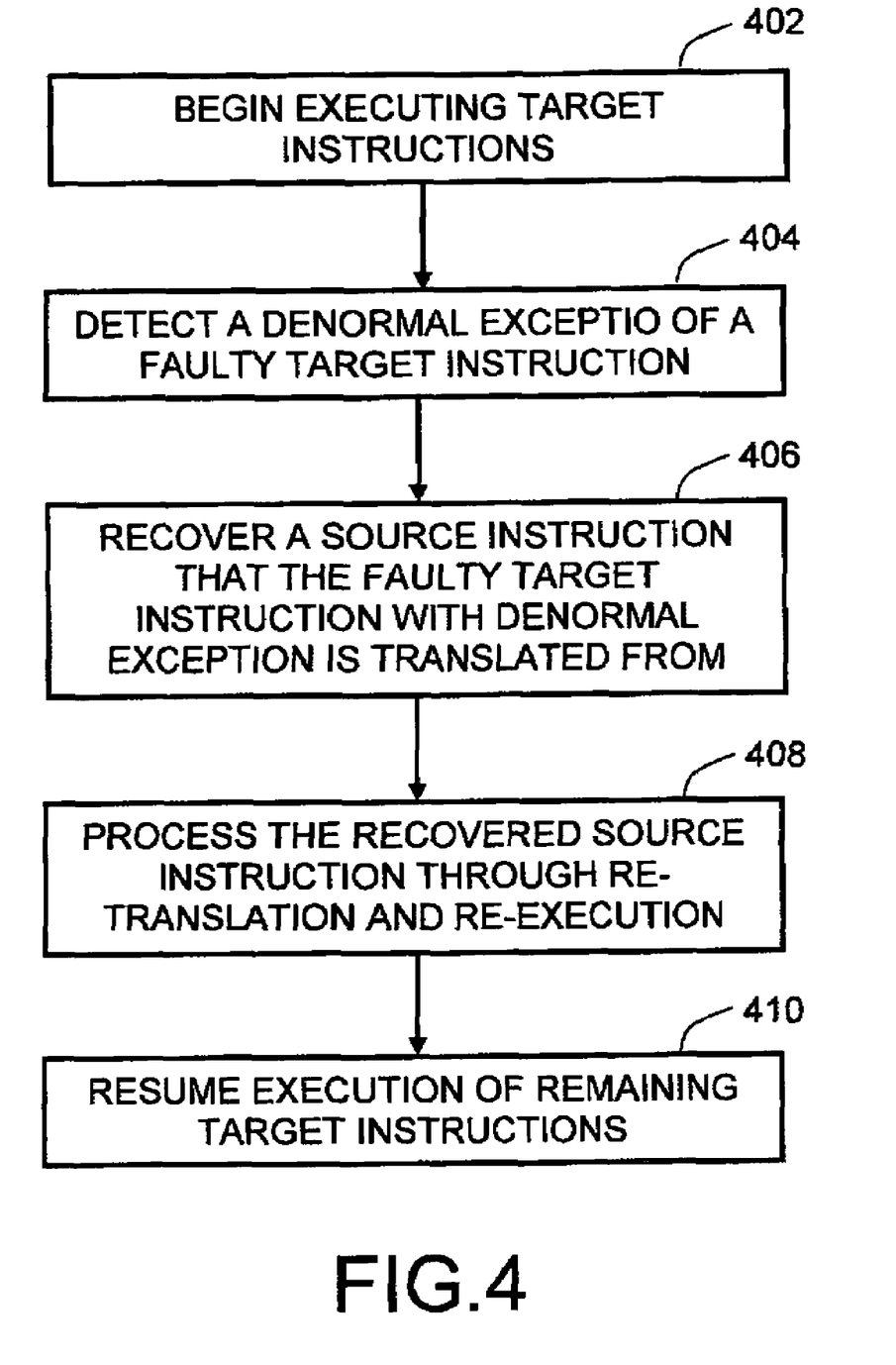
FIG. 4 is a schematic illustration of a method of handling denormal exceptions during a program code execution when one or more non-denormal exceptions are unmasked, according to illustrative embodiments of the invention.

FIG. 4 is a schematic illustration of a method of handling denormal exceptions during a target code execution when one or more non-denormal exceptions are unmasked, according to illustrative embodiments of the invention. A denormal input control bit in the target platform is unmasked so that processor 102 may detect a denormal exception during target code execution.

According to illustrative embodiments of the invention, processor 102 may execute target instructions as indicated at block 402, and may detect a faulty target instruction that raises a denormal exception as indicated at block 404. However, in this case, the faulty target instruction may also raise other non-denormal exceptions because one or more of the non-denormal control bits are not masked. For example, another type of SSE exceptions such as an "overflow" or an "underflow" exception may be raised by the faulty target instruction. Without knowing all the other exceptions that the faulty target instruction may raise, processor 102 may need to handle the denormal exception using a state recovery mechanism, as described below in detail.

According to illustrative embodiments of the invention, exception handler 109 of binary translator 108, for example, may recover a source instruction, which is an excepted source instruction that the faulty target instruction is translated from, as indicated at block 406. However, the invention is not limited in this respect and the source instruction may be recovered by other means or exception handlers. The recovered source instruction may be re-translated and re-executed as indicated at block 408 and described in detail below with reference to FIG. 5. After execution of the recovered source instruction, processor 102 may resume execution of the remaining target instructions as indicated at block 410.

Figure 5:
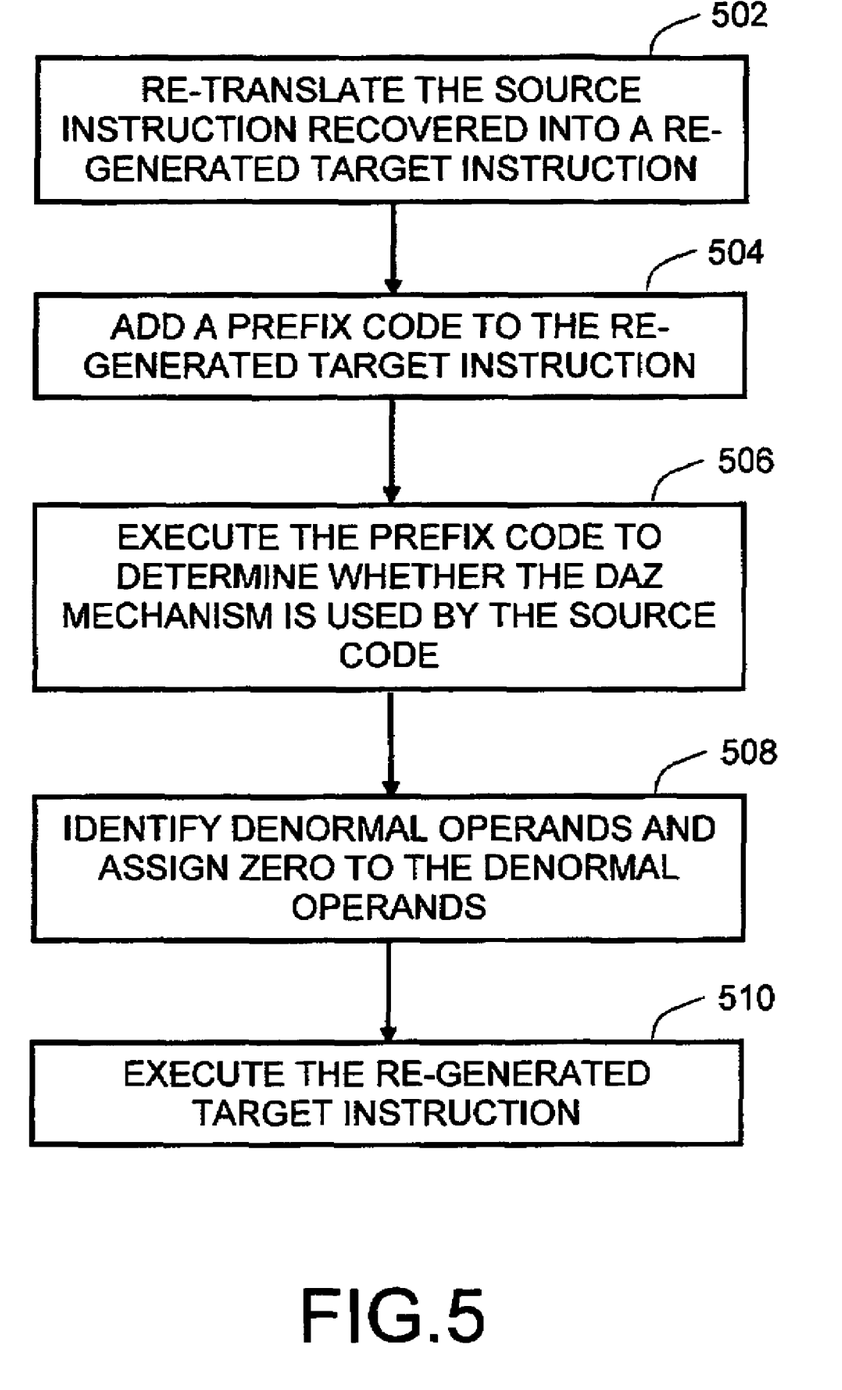
FIG. 5 is a schematic illustration of a method of processing an excepted source instruction recovered from a corresponding faulty target instruction, according to illustrative embodiments of the invention.

FIG. 5 is a schematic illustration of a method of processing an excepted source instruction which is recovered from a faulty target instruction according to illustrative embodiments of the invention.

According to illustrative embodiments of the invention, the recovered source instruction may be re-translated into a re-generated target instruction as indicated at block 502. The translation may be performed separately from the translation of other instructions in order to avoid potential impact due to other exceptions. At block 504, a prefix code, for example, prefix code 121 (FIG. 1), may be attached to the re-generated target instruction, e.g., target instruction 122. Processor 102 may subsequently execute the prefix code, as indicated at block 506, to determine whether the DAZ mechanism is used by the source code. If control instructions in the source code are setting the DAZ bit to "1", indicating that the DAZ mechanism is used by the source code, the prefix code may proceed to identify one or more inputs to the denormal exception and change those inputs that are denormal operands to zero, as indicated at block 508. Processor 102 may then proceed to execute the re-generated target instruction, e.g., target instruction 122 as indicated at block 510.

Figure 6:
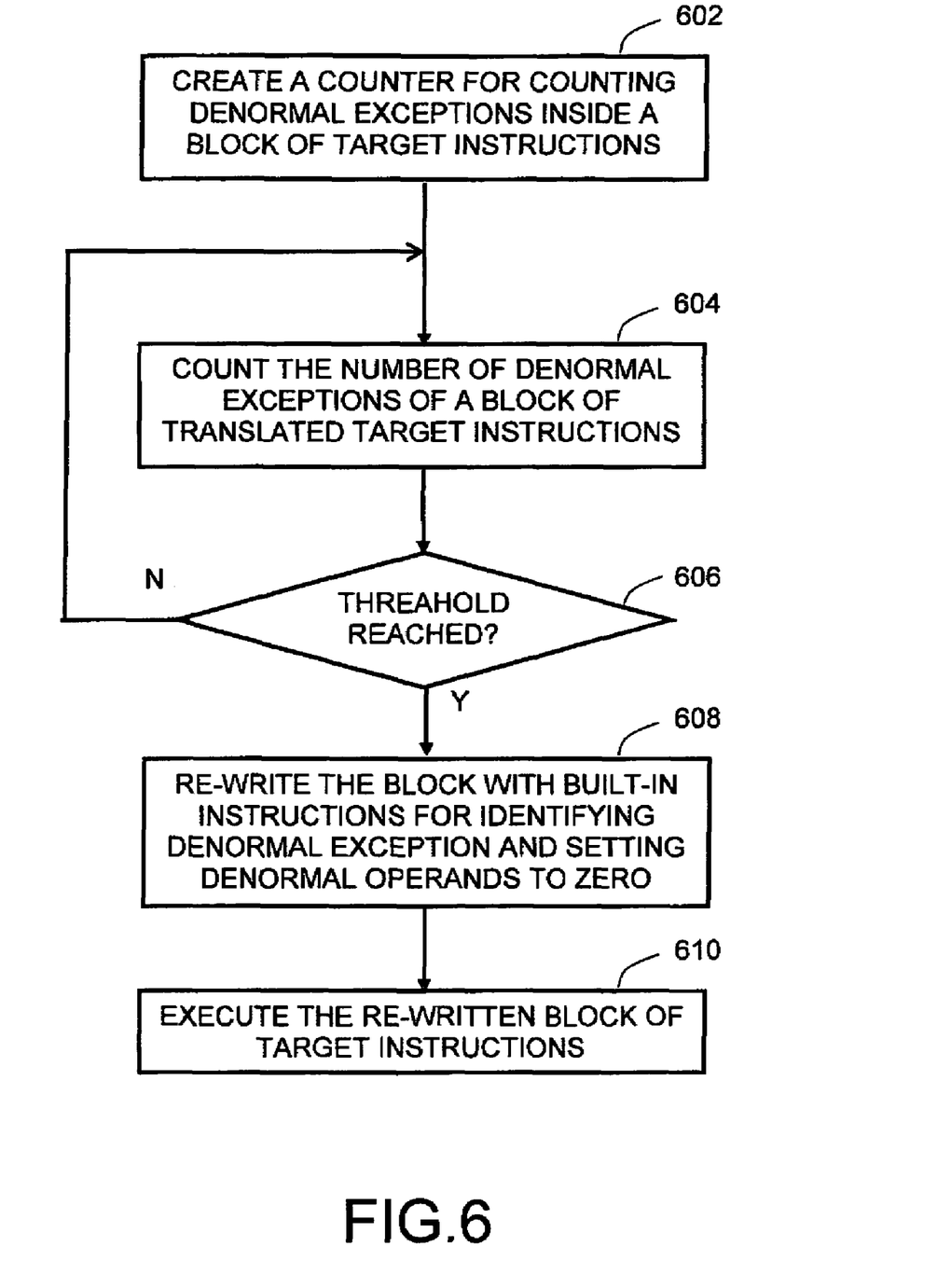
FIG. 6 is a schematic illustration of a method of building a translated target code block having a large number of denormal exceptions according to illustrative embodiments of the invention.

FIG. 6 is a schematic illustration of a method of building a translated code block having a large number of denormal exceptions according to some illustrative embodiments of the invention According to illustrative embodiments of the invention, target instruction set, e.g., target instruction set 120, may be divided into multiple blocks of instructions which may be differentiated by, for example, the address of the first instruction in the blocks. Execution of a block of target instructions that raise a large number of denormal exceptions during execution may be further improved by determining whether a denormal operand condition exists during each iteration of execution of a potentially faulty target instruction.

According to illustrative embodiments of the invention, a counter such as, for example, counter 105 (FIG. 1), may be created for counting denormal exceptions of a block of target instructions, as indicated at block 602. Counter 105 may be a cache based counter and/or may be any other counting mechanism. Counter 105 may count the number of denormal exceptions of a block of target instructions, e.g., target instructions 122 and 123 of target code 120, as indicated at block 604, each time a denormal exception is raised. The number of denormal exceptions raised by the block of target instructions may be compared with a pre-determined threshold, as indicated at block 606. If the number has reached the threshold, the block of target instructions may be re-written to include one or more built-in instructions as indicated at block 608, for example, built-in instruction 124 (FIG. 1). The built-in instructions, when being executed, may identify in-line denormal conditions of each SIMD instruction in the block, and set denormal operands of a denormal exception to zero when the denormal exception is detected, as described in detail below with reference to FIG. 7. The re-written block of target instruction may then be executed as indicated at block 610.

Figure 7:
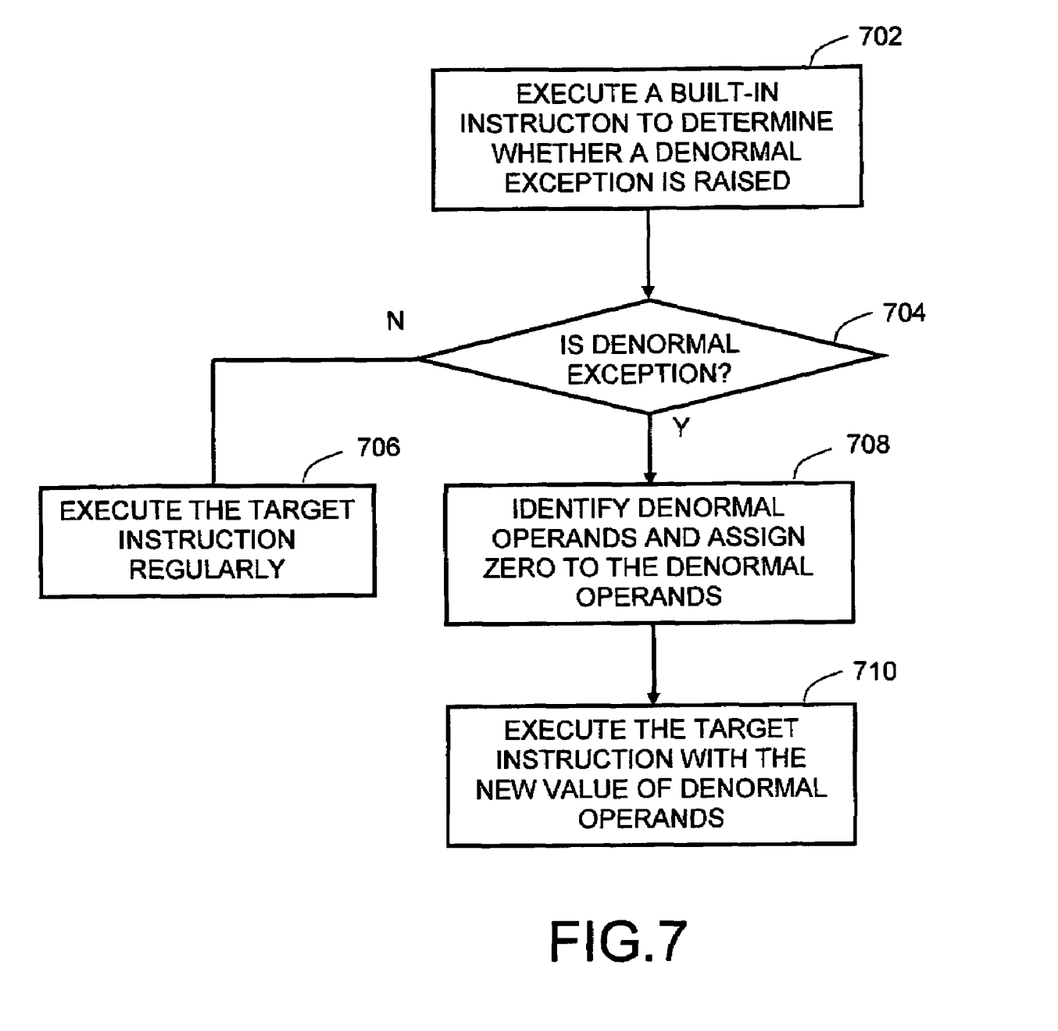
FIG. 7 is a schematic illustration of a method of executing a block of target instructions according to some illustrative embodiments of the invention.

FIG. 7 is a schematic illustration of a method of executing a block of target instructions according to some illustrative embodiments of the invention.

According to illustrative embodiments of the invention, before a target instruction, e.g., instruction 123, is executed, processor 102 may execute a built-in instruction, e.g., instruction 124, to determine whether instruction 123 raises a denormal exception, as indicated at block 702. If a denormal exception is not detected or raised, as indicated at block 704, target instruction 123 may be executed like any other instruction, as indicated at block 706. However, if a denormal exception condition is detected, processor 102 may identify inputs that are denormal operands to target instruction 123 and assign zero to the denormal operands, as indicated at block 708. Target instruction 123 may subsequently be executed with the newly assigned value for denormal operands, as indicated at block 710.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method, comprising:
  unmasking a denormal input control bit on a set of target instructions translated from a set of source instructions, wherein the set of source instructions uses a denormal input handling mechanism and comprises a control instruction to mask a denormal control bit;
  detecting at least one denormal exception raised by a faulty target instruction, wherein an instruction is faulty when the instruction raises a denormal exception, by executing said set of target instructions;
  assigning a predetermined value to one or more denormal operands of said faulty target instruction when one or more control bits corresponding to one or more non-denormal exceptions are masked; and re-executing said faulty target instruction with said predetermined value for said one or more denormal operands.

2. The method of claim 1, comprising:
continuing execution of target instructions following said faulty target instruction by applying results obtained from said execution of said faulty target instruction.

3. The method of claim 2, wherein continuing execution of target instructions following said faulty target instruction comprises:
moving an instruction pointer from pointing to said faulty target instruction to pointing to a subsequent target instruction to be executed; and
executing said subsequent target instruction.

4. The method of claim 1, wherein said predetermined value is zero.

5. A method comprising:
unmasking a denormal input control bit on a set of target instructions translated from a set of source instructions, wherein the set of source instructions uses a denormal input handling mechanism and comprises a control instruction to mask a denormal control bit; wherein an instruction is faulty when the instruction is faulty when the instruction raises a denormal exception, raises a denormal exception,
detecting at least one denormal exception raised by a faulty target instruction by executing said set of target instructions;
recovering a source instruction that said faulty target instruction is translated from when one or more control bits corresponding to one or more non-denormal exceptions are unmasked; and
re-translating said source instruction into a re-generated target instruction.

6. The method of claim 5, comprising:
determining whether said set of source instructions uses said denormal input handling mechanism;
when said denormal input handling mechanism is used, identifying one or more denormal operands that are inputs to said denormal exception; and
assigning a predetermined value to said one or more denormal operands.

7. The method of claim 6, wherein said predetermined value is zero.

8. The method of claim 1, comprising:
counting the number of denormal exceptions during execution of a block of target instructions; and
re-writing said block of target instructions to include one or more built-in instructions when said number of denormal exceptions reaches a predetermined threshold.

9. The method of claim 8, comprising:
executing at least one of said one or more built-in instructions to determine whether a target instruction raises a denormal exception;
when said target instruction raises a denormal exception, identifying one or more denormal operands of said target instruction;
assigning a value of zero to said one or more denormal operands; and
executing said target instruction with the assigned zero value of denormal operands.

10. The method of claim 1, wherein said denormal input handling mechanism is a denormals-are-zeroes mechanism.

11. An apparatus comprising:
a dynamic binary translator to translate a set of source instructions into a set of target instructions, wherein the set of source instructions uses a denormal input handling mechanism and comprises a control instruction to mask a denormal control bit, and to unmask a denormal input control bit on the set of target instructions; and
a processor to execute said set of target instructions to detect at lease one denormal exception raised by a faulty target instruction, wherein an instruction is faulty when the instruction raises a denormal exception, following corresponds to a denormal exception;
wherein the dynamic binary translator comprises an exception handler to assign a predetermined value to one or more denormal operands of said faulty target instruction, and wherein the processor is to re-execute said faulty target instruction with the predetermined value for said one or more denormal operands.

12. The apparatus of claim 11, wherein said processor continues execution of target instructions following said faulty target instruction by applying results obtained from said execution of said faulty target instruction.

13. The apparatus of claim 12, wherein said processor continues execution of target instructions following said faulty target instructions by moving an instruction pointer from pointing to said faulty target instruction to pointing to a subsequent target instruction to be executed.

14. The apparatus of claim 11, wherein said dynamic binary translator comprises an exception handler to recover a source instruction that said faulty target instruction is translated from and to re-translate said source instruction into a re-generated target instruction.

15. The apparatus of claim 14, wherein said processor is to determine whether said set of source instructions uses said denormal input handling mechanism; to identify one or more denormal operands that are inputs to said denormal exception; and to assign a predetermined value to said one or more denormal operands, when said denormal input handling mechanism is used.

16. The apparatus of claim 11, wherein said processor is to count the number of denormal exceptions during execution of a block of target instructions; and to re-write said block of target instructions to include one or more built-in instructions, when said number of denormal exceptions reaches a predetermined threshold.

17. The apparatus of claim 16, wherein said processor is to execute at least one of said built-in instructions to determine whether a target instruction raises denormal exception; to identity one or more denormal operands of said faulty target instructions; and to assign a predetermined value to said one or more denormal operands, when said target instruction raises a denormal exception.

18. A system comprising:
a memory to store a set of source instructions, wherein the set of source instructions uses a denormal input handling mechanism and comprises a control instruction to mask a denormal control bit a set of target instructions, and a dynamic binary translator, wherein said dynamic binary translator is adapted to translate said set of source instructions into said set of target instructions and to unmask a denormal input control bit on the set of target instructions;
a processor to execute said set of target instructions to detect at lease one denormal exception raised by a faulty target instruction, wherein an instruction is faulty when the instruction raises a denormal exception, corresponds to a denormal exception; and
wherein the dynamic binary translator comprises an exception handler to assign a predetermined value to one or more denormal operands of said faulty target instruction; and wherein said processor is to re-execute said faulty target instruction with said predetermined value for said one or more denormal operands.

19. The system of claim 18, wherein said processor continues execution of target instructions following said faulty target instruction by applying results obtained from said execution of said faulty target instruction.

20. The system of claim 18, wherein said dynamic binary translator comprises an exception handler to recover a source instruction that said faulty target instruction is translated from to re-translate said source instruction into a re-generated target instruction.

21. The system of claim 20, wherein said processor is to determine whether said set of source instructions uses said denormal input handling mechanism; to identify one or more denormal operands that are inputs to said denormal exception; and to assign a predetermined value to said one or more denormal operands, when said denormal input handling mechanism is used.

22. The system of claim 18, wherein said processor is to count the number of denormal exceptions during execution of a block of target instructions, and to re-write said block of target instructions to include one or more built-in instructions when said number of denormal exceptions reaches a predetermined threshold.

23. The system of claim 22, wherein said processor is to execute at least one of said built-in instructions to determine whether a target instruction raises denormal exception; to identify one or more denormal operands of said faulty target instructions; and to assign a predetermined value to said one or more denorinal operands, if said target instruction raises a denormal exception.

24. A machine-readable medium having stored thereon a set of instructions that, when executed by a machine, result in translating a set of source instructions into a set of target instructions, wherein the set of source instructions uses a denormal input handling mechanism and comprises a control instruction to mask a denormal control bit, executing said set of target instructions, and unmasking a denormal input control bit on the set of target instructions;
  wherein the instructions result in detecting at least one denormal exception raised by a faulty target instruction, wherein an instruction is faulty when the instruction raises a denormal exception, by executing said set of target instructions;
  assigning a predetermined value to one or more denormal operands of said faulty target instruction when one or more control bits corresponding to one or more non-denormal exceptions are masked; and
  re-executing said faulty target instruction with said predetermined value for said one or more denormal operands.

25. A machine-readable medium having stored thereon a set of instructions that, when executed by a machine, result in translating a set of source instructions into a set of target instructions, wherein the set of source instructions uses a denormal input handling mechanism and comprises a control instruction to mask a denormal control bit, executing said set of target instructions, and unmasking a denormal input control bit;
  wherein the instructions result in detecting at least one denormal exception, raised by a faulty target instruction, wherein an instruction is faulty when the instruction raises a denormal exception, by executing said set of target instructions;
  recovering a source instruction that said faulty target instruction is translated from when one or more control bits corresponding to one or more non-denormal exceptions are not masked; re-translating said source instruction into a re-generated target instruction.

* * * * *